(12) United States Patent
Amend et al.

(10) Patent No.: US 11,547,124 B2
(45) Date of Patent: *Jan. 10, 2023

(54) EQUIPMENT AND METHOD FOR FROZEN CONFECTIONERY PRODUCT WITH LAYERED STRUCTURE HAVING EXTERNAL COATING

(71) Applicant: NESTEC S.A., Vevey (CH)

(72) Inventors: Thomas Aloisius Valentinus Amend, Mountain View, CA (US); Changpu Ma, Shanghai (CN)

(73) Assignee: Societe des Produits Nestle S.A., Vevey (CH)

( * ) Notice: Subject to any disclaimer, the term of this patent is extended or adjusted under 35 U.S.C. 154(b) by 272 days.

This patent is subject to a terminal disclaimer.

(21) Appl. No.: 14/412,855

(22) PCT Filed: Jul. 3, 2013

(86) PCT No.: PCT/EP2013/063982
§ 371 (c)(1),
(2) Date: Jan. 5, 2015

(87) PCT Pub. No.: WO2014/006068
PCT Pub. Date: Jan. 9, 2014

(65) Prior Publication Data
US 2015/0157042 A1    Jun. 11, 2015

(30) Foreign Application Priority Data
Jul. 5, 2012    (WO) ................ PCT/CN2012/078242

(51) Int. Cl.
*A23G 9/24* (2006.01)
*A23G 9/48* (2006.01)
(Continued)

(52) U.S. Cl.
CPC ................ *A23G 9/245* (2013.01); *A23G 9/28* (2013.01); *A23G 9/283* (2013.01); *A23G 9/48* (2013.01); *A23P 30/25* (2016.08)

(58) Field of Classification Search
CPC . A23G 9/283; A23G 9/48; A23G 9/28; A23G 9/282; A23V 2002/00
See application file for complete search history.

(56) References Cited

U.S. PATENT DOCUMENTS 3,347,287 A * 10/1967 Geber .................... A23G 9/282
141/105
3,420,268 A    1/1969 Mueller
(Continued)

FOREIGN PATENT DOCUMENTS

| SU | 664626 | 10/1977 |
|---|---|---|
| WO | 9526640 | 10/1995 |
| WO | 2011086058 | 7/2011 |

OTHER PUBLICATIONS

Hand annotated US2013/004531; 1 pg. (Year: 2011).*
Office Action for related Russian Application No. 2015103712/13; report dated Jun. 28, 2017.

*Primary Examiner* — Steven N Leff
(74) *Attorney, Agent, or Firm* — K&L Gates LLP

(57) ABSTRACT

The present invention is concerned with an apparatus for making a coated frozen confectionery product by co-extrusion of a frozen confection and a coating substance, and in particular a nozzle body forming part of the apparatus. The nozzle body according to the invention has a nozzle exit, through which the coated confectionery product is discharged as stream; the stream of coated confectionery product being the frozen confectionery product at least partially coated with the coating substance. The nozzle body preferably comprises: —a frozen confection product channel communicating with at least one frozen confectionery inlet (Continued)

port and leading to the nozzle exit, —at least one coating supply channel communication with at least one coating inlet port and leading to at least one coating application chamber opening into the frozen confection product channel at a position upstream of the nozzle exit, and—a spreading tongue arranged downstream of the at least one coating application chamber and upstream of or forms part of the nozzle exit, said spreading tongue being adapted to distribute the coating substance onto the surface of the frozen confection and define the cross sectional shape of the stream of coated confectionery product. The invention also relates to a method for making a coated frozen confectionery product by co-extrusion.

15 Claims, 2 Drawing Sheets

(51) Int. Cl.
*A23G 9/28* (2006.01)
*A23P 30/25* (2016.01)

(56) References Cited

U.S. PATENT DOCUMENTS

| | | | | |
|---|---|---|---|---|
| 3,971,853 | A | * | 7/1976 | Crowder ................. A23G 9/04 426/249 |
| 5,135,767 | A | * | 8/1992 | Daouse ................... A23G 9/26 425/91 |
| 5,283,070 | A | | 2/1994 | Bertrand et al. |
| 5,700,494 | A | | 12/1997 | Masse et al. |
| 5,962,035 | A | | 10/1999 | Masse et al. |
| 2011/0200718 | A1 | | 8/2011 | Swertvaegher et al. |

\* cited by examiner

EQUIPMENT AND METHOD FOR FROZEN CONFECTIONERY PRODUCT WITH LAYERED STRUCTURE HAVING EXTERNAL COATING

CROSS REFERENCE TO RELATED APPLICATIONS

The present application is a National Stage of International Application No. PCT/EP2013/063982, filed on Jul. 3, 2013, which claims priority to International Application No. PCT/CN2012/078242, filed on Jul. 5, 2012, the entire contents of which are being incorporated herein by reference.

FIELD OF THE INVENTION

The present invention relates to a frozen confectionery product with a layered structure having an external coating and to a method and an apparatus for manufacturing the same.

BACKGROUND OF THE INVENTION

Some confectionery products containing inclusions or crispy layers of exist. In particular, confectionery product containing chocolate and ice-cream exist. While a desire to obtain such products is present, the production techniques available are in many instances limited to enrobing techniques where for instance ice-cream is enrobed by chocolate.

During an operation of filling ice cream into a receptacle, the process of ice cream dosing is typically a discontinuous process, in which the ice cream product is dosed from a nozzle into a receptacle such as a cup or wafer cone. Dosing is stopped when the receptacle is full and restarts again when the next empty receptacle is placed beneath the dosing nozzle.

During ice cream dosing, the application of a coating material onto the ice cream surface is typically achieved by spraying the coating substance from a spray nozzle or by projecting the coating out of a tube against the ice cream surface after the ice cream has left the nozzle. Both ways are characterized by a small gap between the chocolate supply device and the ice cream surface. The advantage of this arrangement becomes clear when studying in detail the application of a fat-based coating onto the surface of an ice cream:

Such fat based coating materials are typically applied in a temperature range of 30° C. to 40° C., where the coating material is in a liquid form. When getting in touch with the ice cream, which is typically at a temperature in the range of −4° C., the coating material will quickly cool down and solidify. If the exit of a pipe or channel, supplying a fat based coating material onto the ice cream surface, is in close contact or touching the ice cream surface, the chocolate at the outlet will be cooled down by the ice cream. This will lead to a solidification of the coating substance in the pipe or channel and subsequent blockage or accumulation of solidified coating at this point. The required unblocking and cleaning are typically done by melting the solidified chocolate, using e.g. hot water or steam. This unblocking and cleaning cause an interruption of the production flow and reduces the overall performance of the production process.

It is therefore advantageous to leave a gap between the ice cream surface and the exit of a pipe or channel to avoid direct contact and cooling down of the pipe or channel. When using a spray gun to apply the chocolate, the gap between spray nozzle and ice cream can be easily bridged, however, as mentioned earlier, spraying does not allow a precise and homogeneous deposition of chocolate.

One may speculate that projecting chocolate through a slit-shaped nozzle onto the ice cream surface would allow to apply a band-shaped chocolate layer. However, there are limitations to this approach due to the interfacial tension of the liquid coating. Once the liquid chocolate leaves a slit-shaped nozzle or channel and is being projected towards the surface of the ice cream stream, the interfacial tension pulls the chocolate stream into a shape which is round in cross section. As a result of this, the initially band-shaped stream of chocolate will end on the ice cream surface as as a line of chocolate, rather than a thin layer.

It is therefore difficult to find an acceptable compromise: a nozzle for applying coating substance very close or touching the ice cream tends to block, but a larger distance between nozzle and ice cream makes application of a homogeneous layer more difficult.

U.S. Pat. No. 5,135,767 discloses to make a cup or cone having a flaky texture, where superposed ribbons of ice-cream and chocolate are extruded into a mold in the form of spirals by means of an extrusion assembly comprising a flat extrusion tube and a spray tube. The extrusion assembly performs a spinning movement resulting from an eccentric rotational movement and an ascending movement relatively to the mold.

However, as the chocolate is sprayed onto the ice-cream it is very difficult to control the thickness of the chocolate layers and virtually impossible to obtain regular crunchy layers of a desired thickness. It is also difficult to precisely control the location of the applied chocolate when using a spray technique. Furthermore, the spraying mechanism is relatively expensive.

Spraying of chocolate is also applied in U.S. Pat. No. 5,283,070 wherein a layered cone with alternating layers of chocolate and ice-cream is made by extruding ice-cream into a vertically descending helix rotating about a vertical axis and having spaced flights which define passages there between. Also in this case, it is very difficult to control the thickness of the chocolate layers, and the apparatus is rather expensive due to the spraying process.

WO 2011/086058 discloses a frozen confectionery product and a method of manufacturing the same. The disclosure pertains to a production by rotary vertical extrusion by use of a nozzle. Outlet ports are provided in the nozzle coating the ice-cream while it flows out of the nozzle and form annular or helical chocolate layers upon rotation of the nozzle and the container with respect to each other. A characteristic of the product disclosed is that chocolate is buried inside the product. There is no coverage on the outside of the product provided by this procedure.

Thus, the structures of confectionery product produced by the known method can still be improved to provide uniform and controlled distribution of fat based coatings material onto and throughout the product. in a controlled manner.

OBJECT OF THE INVENTION

It is thus an object of the present invention to provide and apparatus and method for making frozen confectionery product which overcomes or at least mitigates the drawbacks mentioned above. It is also an object of this invention to provide a method to apply chocolate simultaneously onto the outside of the product in one processing step (without using a separate dipping step). It is further an object of the invention, to provide a method and apparatus for producing a confectionery product comprising chocolate being visible by the consumer and providing and appealing effect.

SUMMARY OF THE INVENTION

The object is achieved by an apparatus for making a coated frozen confectionery product by co-extrusion of a frozen confection and a coating substance, and in particular a nozzle body forming part of the apparatus. The nozzle body according to the invention has a nozzle exit, through which the coated confectionery product is discharged as stream; the stream of coated confectionery product being the frozen confectionery product at least partially coated with the coating substance. The nozzle body preferably comprises
- a frozen confection product channel communicating with at least one frozen confectionery inlet port and leading to the nozzle exit,
- at least one coating supply channel communication with at least one coating inlet port and leading to at least one coating application chamber opening into the frozen confection product channel at a position upstream of the nozzle exit, and
- a spreading tongue arranged downstream of the at least one coating application chamber and upstream of or forms part of the nozzle exit, said spreading tongue being adapted to distribute the coating substance onto the surface of the frozen confection and define the cross sectional shape of the stream of coated confectionery product.

A new way to apply a layer of chocolate of consistent and adjustable thickness onto the surface of ice cream has been provided. In accordance with the present invention the pipe or channel—that is the coating application chamber—providing the coating material is brought in direct contact with the ice cream. Furthermore, the coating is applied in a way that allows spreading the coating over the ice cream surface into a layer of homogeneous and adjustable thickness.

The problem of chocolate solidifying—if occurring—can been mitigated by keeping all parts which are in contact with the chocolate at an elevated temperature sufficient to keep the chocolate liquid. Such a temperature is in the range of the temperature of the chocolate, which is about between 30° C. and 40° C.

In the present context, a number of terms are used in a manner being ordinary to a skilled person, some of which are briefly discussed below:

Coating is preferably used to mean the process of and the result of applying a layer of chocolate to frozen confection in a manner where the applied chocolate forms an outermost layer. It is noted, that in the present invention, the coating is applied to frozen confection and while the chocolate form the outermost layer extrusion, the coated frozen confection is arranged in a receptacle preferably as a layered structure, whereby some parts of the coating form layers of chocolate internally in the frozen confection contained in the receptacle.

Frozen confection is preferably used to mean but not limited to ice-cream, milk ice, sherbet, sorbet, water ice, frozen yogurts.

Coating substance may mean water based substances such as jellies, sauces, such as fruit sauces and is preferably used to mean fat based substances such as chocolate or compound coatings.

Layered structure is preferably used to mean a structure which has layers of frozen confection with interposed layers of coating substance.

Chocolate is preferably used to mean a raw or processed food produced from the seed of the tropical *Theobroma cacao* tree or a compound coating, made up from other fats than cocoa butter, such as coconut fat or palm oil.

Star-shaped cross section is preferably to be construed broadly to mean cross sections having any number larger than 3 points where the outer contour of the star-shape may be smooth or sharp or combinations thereof. Similarly, concave-shaped is also to be construed broadly and includes v-shape, u-shape, n-shape and similar concave shapes.

Circular translatoric is typically used to denote a rotational movement of a body where the orientation of the body with reference to a fixed coordinate system does not change during the movement. Thus, a body not rotating during its movement in a circular translatoric movement will have the same orientation with reference to a fixed co-ordinate system, e.g. up will always be up and down will always be down of the body during its movement.

According to preferred embodiments, the apparatus may further comprise a holder for a receptacle, such as an edible container, preferably being a wafer cone, into which the stream of coated confectionery product is discharged. The nozzle body and holder for the receptacle is preferably moveable and moves during discharge of the stream of coated confectionery product relatively to each other in directions being:
- away from each other in a direction being parallel to the direction of the stream of coated confectionery product discharged from the nozzle exit, and
- in a circular translatoric movement in planes being perpendicular to the longitudinal direction of the stream of coated confectionery product discharged.

The relative movement may preferably be provided by movement of the nozzle body while the holder for receptacle does not move during discharge of the stream coated confectionery product. Alternatively, the relative movement is provided by movement of the holder for receptacle while the nozzle body does not move during discharge of the stream of coated confectionery product.

The nozzle body may advantageously be a heat-able nozzle body wherein the heating may be provided by heating means adapted to heat to the material of the nozzle body at position(s) above the coating application chamber. The heating means may preferably be heating channels through which a liquid typically having a temperature between 30° C. and 80° C., such as water or oil may flow. Preferably, the heating channel(s) encircles the frozen confection channel preferably internally of the nozzle body.

Alternatively or in combination thereto, the heating means may be electrical heating means, such as conductive wires, encircling the frozen confection channel preferably internally of the nozzle body.

In preferred embodiments, the spreading tongue may have a star-shaped cross section with a concave-shaped perimeter section in between the points of the star.

Preferably, the coating application chambers encircles the frozen confection channel with one or more openings into the frozen confection channel.

The nozzle body may preferably comprise a frozen confection valve controlling the inflow of frozen confection to the frozen confection channel. The seat of the frozen confectionery valve may preferably be arranged at a distance from the nozzle exit so that the volume of the frozen confectionery channel measured from the valve seat and to the nozzle exit is below 20 ml.

Preferred embodiments of the apparatus according to the present invention are preferably adapted to discharge a stream of coated confectionery product over a period between 0.5 and 3 seconds comprising at least 50 ml of ice-cream and 3-30 ml of coating substance.

Preferably, the coated confectionery product is discharged fully coated.

In a second aspect, the invention relates to a method for making a coated frozen confectionery product by co-extrusion from a nozzle body—preferably being a nozzle body according to the first aspect of the invention—of frozen confection and coating substance, the coated confectionery product being discharged as stream and the stream of coated confectionery product being frozen confection at least partially coated with the coating substance, wherein the frozen confectionery is coated with the coating substance by being forced intimately onto the surface of the frozen confectionery product and exits the nozzle body together with frozen confectionery products past a spreading tongue through a nozzle exit. The method preferably comprises co-extruding by use of the nozzle body the stream of coated confectionery product into a receptacle,
moving the nozzle body and receptacle relatively to each other
away from each other in a direction being parallel to direction of the stream of coated confectionery product discharged from the nozzle body, and
in a circular translatoric movement in planes being perpendicular to the longitudinal direction of the stream of coated confectionery product discharged.

The stream of coated confectionery product may preferably be co-extruded with a star-shaped cross section being coated with coating substance in concave-shaped regions of the star-shape and no coating substance coating being applied in regions of and at the points of the star-shape, or
in convex-shaped regions of the stars-shape and no coating substance being applied in the concave-shaped regions of the star-shape.

In preferred embodiments, the stream of confectionery product may preferably also be fully coated.

In yet other embodiments, the frozen confection is ice-cream and the coating substance is chocolate.

In preferred embodiments, the method may further comprise heating the nozzle body to a temperature of above the temperature of the ice cream, typically to a temperature between 30° C. and 80° C.

Preferred embodiments of the method may further comprise controlling the stream of coating substance and frozen confection streaming through the nozzle during extrusion in manner where the amount of coating substance and ice-stream are decreasing, increasing or constant.

Preferably, the relative movement is provided by movement of the nozzle body while the holder for receptacle does not move during discharge of the stream confectionery product. Alternatively, the relative movement may be provided by movement of the holder for receptacle while the nozzle body does not move during discharge of the stream of confectionery product.

BRIEF DESCRIPTION OF THE DRAWINGS

Additional features and advantages of the present invention are described in, and will be apparent from the description of the presently preferred embodiments which are set out below with reference to the drawings in which.

DETAILED DESCRIPTION OF THE INVENTION

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

Figure 1:
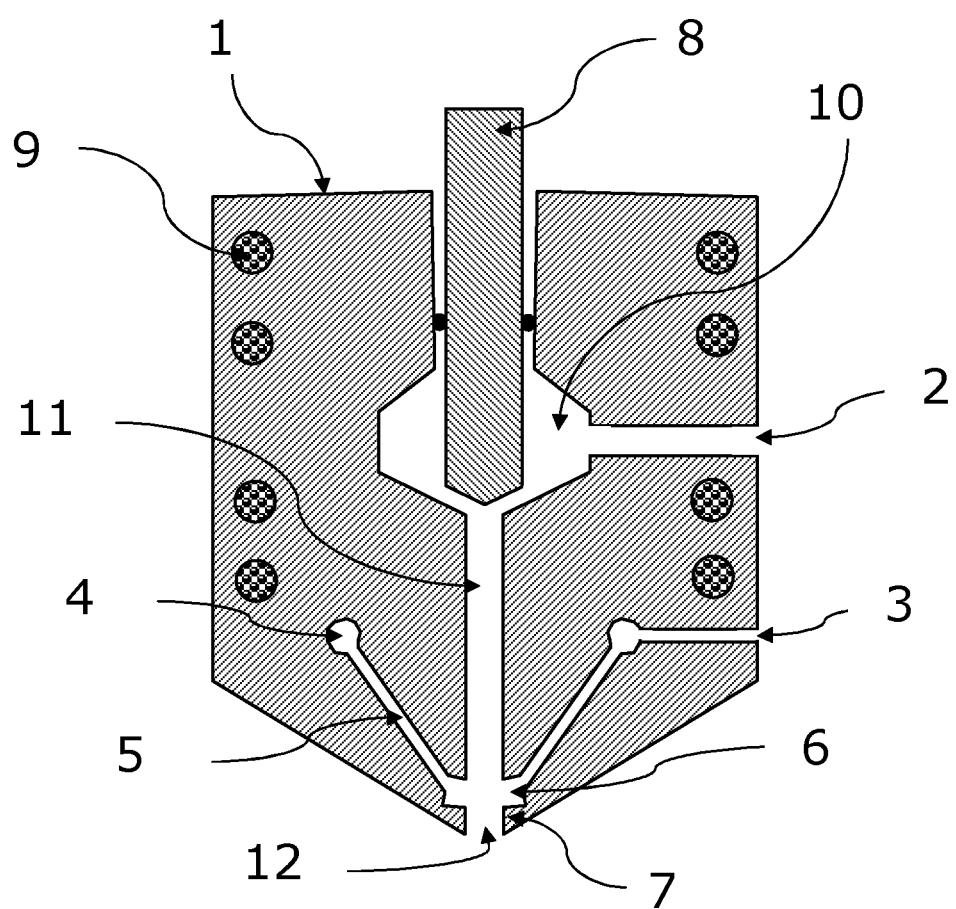
FIG. 1 shows a cross sectional view of an extrusion nozzle body comprising an ice-cream valve, a heating device in form of heating channels and nozzle outlet features according to the present invention.

Reference is made to FIG. 1 which shows a nozzle body according to a preferred embodiment of the invention. The nozzle body 1 is a part of an apparatus for making a coated frozen confectionery product by co-extrusion of a frozen confection and a coating substance. The apparatus comprising a nozzle body 1 with a nozzle exit 12, through which the coated confectionery product is discharged as stream. The stream of coated confectionery product is the frozen confection product at least partially coated with the coating substance.

The nozzle body 1 comprising a frozen confection product channel 11 communicating with at least one frozen confectionery inlet port 2 and leading to the nozzle exit 12. As shown in FIG. 1, the frozen confectionery product channel 11 extends from a frozen confectionery product valve chamber 10 having a frozen confectionery valve 8 which may be activated to perform a reciprocating movement to close and open the opening of the frozen confectionery channel 11 facing into the valve chamber 10 and thereby control the flow of frozen confectionery product into the frozen confectionery channel 11.

The nozzle body 1 further comprising at least one coating supply channel 5 communication with at least one coating inlet port 3 and leading to at least one coating application chamber 6 opening into the frozen confection product channel 11 at a position upstream of the nozzle exit 12. Distribution of coating substance from the coating substance inlet port 3 and to the coating supply channel(s) 5 is done by a coating ring channel 4 being a torus shaped channel.

A coating application chamber 6 (see also FIG. 3a) is a void having an opening facing into the frozen application channel 11 through which the coating substance is forced to enter into intimately contact with the surface of the frozen confectionery product streaming in the frozen confectionery channel 11.

Downstream of the coating application chamber 6 and upstream of the nozzle exit 12 a spreading tongue 7 is arranged. The spreading tongue 7 is adapted by its geometrical shape to distribute the coating substance onto the surface of the frozen confection and define the cross sectional shape of the stream of coated confectionery product leaving the nozzle body 1.

While the nozzle body 1 has proven to be particular useful and advantageous when the frozen confectionery product is ice cream and the coating substance being chocolate, the nozzle body 1 can be used for other combinations of frozen confectionery product and coating substance. This means that in the ice cream—cholate combination:

- the frozen inlet port 2 serves as an ice cream inlet 2,
- the coating inlet port 3 serves as a chocolate inlet 3,
- the coating ring channel 4 distributing coating substance from the coating inlet port 3 to the coating supply channel 5 serves as a chocolate ring channel 4,
- the coating supply channel 5 serves as a chocolate supply channel 5,
- the coating application chamber 6 serves as a chocolate application chamber 6,
- the frozen confectionery product valve chamber 10 serves as an ice cream valve chamber 10,
- the frozen confectionery product channel 11 serves as an ice cream channel 11, Accordingly, the following disclosure of the invention is made with reference to a combination of ice cream and chocolate; however, the teaching presented also covers other combinations.

The nozzle body 1 is fabricated from material that allows sufficient conductivity of heat, such as stainless steel or aluminium. Integrated in the nozzle body 1 are one or more heating channels which are connected to a heating system. The heating system comprises a liquid such as water which is circulated through the heating channels 9 by means of a pump and which is heated continuously by a heater arranged externally to the nozzle body 1.

Alternatively, the heating system may consist of electrical resistance heaters embedded in the nozzle body 1 preferably at the locations of the heating channels 9 as shown in FIG. 1.

The nozzle body 1 contains a system of channels used to provide chocolate to the ice cream surface. A chocolate inlet port 3 is located at the nozzle body's 1 surface and is connected to a chocolate supply system, which is typically a pump, metering defined amounts of chocolate into the nozzle body 1 over a defined period of time during dosing the ice cream in a receptacle. The chocolate entering the nozzle body 1 is distributed via a chocolate ring channel 4 into several chocolate supply channels 5. The chocolate supply channels 5 exit into the application chambers 6, where the chocolate gets in touch with the ice cream surface. The ice cream enters into the nozzle body 1 through an ice cream inlet port (2) and travels through the ice cream valve chamber 10, past the valve piston 8 and through the ice cream channel 11 towards the exit of the nozzle 12.

The heating provided to the nozzle is sufficiently strong to keep the entire nozzle body 1 warm at a temperature which is in the range of a liquid chocolate. This is true as well for the nozzle exit part. The chocolate supply channels 5, the chocolate ring channel 4 and the chocolate application chamber 6 remain at a typical temperature of liquid chocolate and the outermost part of the nozzle body 1 as well as the spreading tongue 7 is not being cooled below this temperature.

During a typical dosing operation to fill receptacle in the form of a cup or a wafer cone, the valve piston 8 is lifted, opening the passage of ice cream from the ice cream inlet 2 through the ice cream channel 11 to the nozzle exit 12. While the ice cream is dosed, a defined amount of chocolate is dosed into the chocolate application chamber 6 and builds up pressure which is homogeneous throughout said chamber 6.

As a result of the pressure, the chocolate is forced intimately onto the ice cream surface, and exits, together with the ice cream, past the spreading tongue 7 through the nozzle exit 12. The spreading tongue provides a good distribution of the chocolate onto the ice cream surface.

Design of the ice cream valve has proven to be a difficult task. Ice cream valves typically used for dosing ice cream into cups or wafer cones are equipped with a function called backsuction. This backsuction function largely eliminates "tailing" of the ice cream. The term describes the formation of an unwanted long string of ice cream extending over the surface of the finished product. It may form when the dosing nozzle is retracted from the receptacle after finishing the dosing step. Through the suck-back step, the portion of ice cream residing at the nozzle exit is pulled back up into the nozzle, disrupting and eliminating the tail.

When dosing chocolate together with the ice cream, both liquid chocolate and ice cream will be sucked back into the nozzle. Drops of liquid chocolate, surrounded by cold ice cream will then quickly solidify inside the nozzle body 1 and can subsequently block the free passage of ice cream through the nozzle exit 12.

By eliminating the suck back function, chocolate will not be sucked up. To eliminate the tailing without this function, the ice cream valve and in particular the seat 8a of the ice cream valve is arranged at a position close to the nozzle exit 12. The small amount of ice cream available in the ice cream channel is not sufficient to create a significant tail. Typically, the seat is arranged at a distance from the nozzle exit 12 so that the volume of the frozen confectionery channel 11 measured from the valve seat 8a and to the nozzle exit 12 not including the volume of the ice cream application chamber is below 20 ml.

Figure 2:
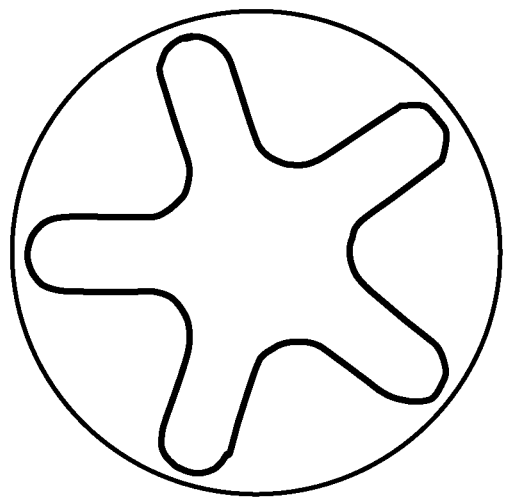
FIG. 2 shows the nozzle shape at the exit according to the present invention.

An example of a nozzle exit 12 design is disclosed in FIG. 2, showing a 5-star nozzle. The possible designs of the nozzle exit 12 are not limited to a 5 star shape but may include other shapes such as 3 star, 4 star or more star shapes. The spikes of the stars can be of various lengths. It is also possible to eliminate any spikes and create a round, oval or other shape nozzle exit 12.

Figure 3A:
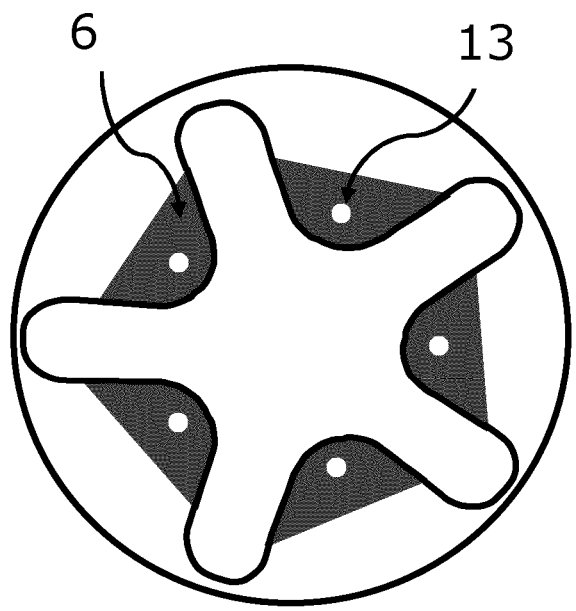
FIG. 3a shows schematically the chocolate application chambers and the chocolate inlet of the chocolate supply channels in a cross-sectional view, perpendicular to the direction of the streaming ice cream.

The application of chocolate is controlled by the size of the application chambers. In FIG. 3a, the size of the application chambers 6 allows coating of the spikes on their central part and leaving the outer portions of the spikes uncoated. In the same figure, the inlet of chocolate from the chocolate supply channel is also indicated 13 as an exit of chocolate—or in general coating—supply channel into the application chamber 6.

Figure 3B:
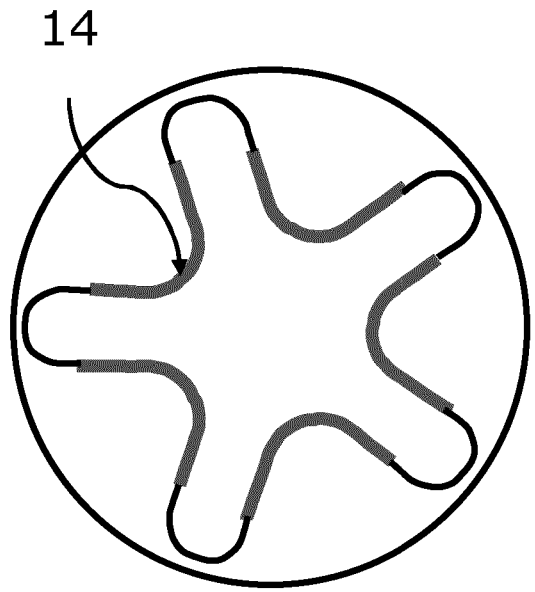
FIG. 3b shows how chocolate is applied onto the ice cream surface in the area between the tips of the spikes, leaving those tips uncovered.

FIG. 3b shows how the chocolate 14 (area of chocolate—or in general coating substance—application onto the extruded ice cream) is covering parts of the surface of the ice cream, leaving the tips of the spikes uncovered.

The chocolate entering an application chamber 6 through supply channel 5 gets applied only onto those parts of the ice cream stream which are exposed to the chocolate chamber 6. By enlarging or reducing the chamber 6 and hence the contact area of chocolate and ice cream, the coated part can be precisely defined.

It is therefore possible to coat only the outermost parts of the spikes and leave the inner parts uncoated. It is also possible to coat the entire surface of the ice cream. In the case of omitting the spikes completely, it is then also possible to produce a fully coated, circular stream of ice cream.

By using two chocolates of different color (such as a white chocolate and a dark chocolate) and supplying these chocolate to different application chambers, it is possible to have a 2 color effect.

Product Examples

Using the nozzles described, various products can be manufactured.

One of the desired product characteristics is an ice cream cone or ice cream cup characterized by a dome shaped decor extending above the receptacle. The nozzle type is a multi star nozzle.

In a preferred embodiment of the invention, the ice cream dome is produced in a way which generates layers of chocolate inside the dome as well as a chocolate coverage on the outside. Due to the nature of the nozzle body 1 and process, this design is achieved during one single dosing step—without the need to do a dipping into chocolate to achieve the outside coating.

The product is manufactured by first moving a receptacle underneath the dosing nozzle. Then the ice cream flow is initiated by opening the ice cream valve of the nozzle. When the receptacle is largely filled, in a subsequent step, an ice cream dome is being build up extending over the rim of the receptacle. During this step, chocolate is dosed into the nozzle in a continuous flow in order to create the desired chocolate structures.

At the same time, the nozzle is now continuously moved in a circular, orbital motion while being lifted up simultaneously. The nozzle follows an upward spiral path. During this movement, the nozzle does not rotate but keeps the same special orientation.

As a result, the stream of ice cream with it's outside chocolate coverage is deposited like a thick spiral into a dense cylinder-like form, which is called an ice cream dome. During the deposition of the ice cream stream, it's outside chocolate coverage becomes partly buried inside the dome, forming layers of chocolate spiraling up. At the same time, the chocolate coverage remaining visible (not buried) forms an outside coverage.

Both outside coverage and inside layers are produced during one dosing step.

The invention claimed is:

1. An apparatus for making a coated frozen confectionery product by co-extrusion of a frozen confection and a coating substance, the apparatus comprising:
   a nozzle body with a nozzle exit, through which the coated confectionery product is discharged as a stream, the stream of coated confectionery product comprises the frozen confection at least partially coated with the coating substance, the nozzle body comprising:
      a frozen confection product channel communicating with at least one frozen confectionery inlet port and leading to the nozzle exit;
      at least one coating supply channel in communication with at least one coating inlet port and leading to at least one coating application chamber opening into the frozen confection product channel at a position upstream of the nozzle exit, the at least one coating application chamber configured to force the coating substance into contact with a surface of the frozen confection,
      the frozen confectionary product channel comprising a first portion that directs the frozen confection from the at least one frozen confectionary inlet port to the at least one coating application chamber, and the frozen confectionary product channel comprises a second portion that directs the frozen confection with the coating substance thereon from the at least one coating application chamber through a spreading tongue to the nozzle exit; and
      the spreading tongue is a surface area within the frozen confection product channel and arranged downstream of the at least one coating application chamber and upstream of the nozzle exit, the spreading tongue configured to distribute the coating substance onto the surface of the frozen confection and define the cross sectional shape of the stream of the coated confectionary product, the spreading tongue has a star-shaped cross section with a concave-shaped perimeter section in between points of the star, the nozzle body configured for circular translatoric movement in planes perpendicular to a longitudinal direction of the stream of the coated confectionery product discharged from the nozzle body.

2. The apparatus according to claim 1, further comprising:
   a holder for a receptacle into which the stream of coated confectionary product is discharged, and the nozzle body and the holder for the receptacle are configured to be moved during discharge of the stream of coated confectionery product relatively to each other in directions being:
   away from each other in a direction parallel to the direction of the stream of coated confectionary product discharged from the nozzle exit; and
   in a circular translatoric movement in the planes perpendicular to the longitudinal direction of the stream of coated confectionary product discharged from the nozzle exit.

3. The apparatus according to claim 1, wherein the nozzle body is a heat-able nozzle body, the heating provided by a heater configured to heat material of the nozzle body at a position above the at least one coating application chamber.

4. The apparatus according to claim 3, wherein the heater is a heating channel through which a liquid having a temperature between 30° C. and 80° C. flows, the heating channel encircling the frozen confection product channel.

5. The apparatus according to claim 1, wherein the at least one coating application chamber encircles the frozen confection product channel and comprises one or more openings into the frozen confection product channel.

6. The apparatus according to claim 1, wherein the nozzle body comprises a frozen confection valve controlling inflow of the frozen confection to the frozen confection product channel.

7. The apparatus according to claim 6, wherein a seat of the frozen confection valve is arranged at a distance from the nozzle exit so that a volume of the frozen confection product channel measured from the frozen confection valve seat to the nozzle exit is below 20 ml.

8. The apparatus according to claim 1, wherein the frozen confection is ice-cream, and the apparatus is configured to discharge a stream of the coated confectionary product over a period between 0.5 and 3 seconds comprising at least 50 ml of the ice-cream and 3-30 ml of the coating substance.

9. A method for making a coated frozen confectionery product, the method comprising:
   forcing, by an at least one coating application chamber, a coating substance into contact with a surface of a frozen confection in a frozen confectionary product channel,
   the frozen confectionary product channel comprising a first portion that directs the frozen confection from at least one frozen confectionary inlet port to the at least one coating application chamber, and the frozen confectionary product channel comprising a second portion that directs the frozen confection with the coating substance thereon as the coated frozen confectionary product, from the at least one coating application chamber through a spreading tongue to a nozzle exit, co-extruding the coated frozen confectionary product from a nozzle body, the coated confectionery product discharged from the nozzle body into a receptacle as a stream comprising the frozen confection at least partially coated with the coating substance, wherein the frozen confection is coated with the coating substance by the coating substance being forced intimately onto the surface of the frozen confection and exiting the nozzle body together with the frozen confection past the spreading tongue and then through the nozzle exit, the spreading tongue is a surface area within the frozen confection product channel upstream of the nozzle exit, the spreading tongue has a star-shaped cross section with a concave-shaped perimeter section in between points of the star; and moving the nozzle body and the receptacle relatively to each other:

away from each other in a direction parallel to direction of the stream of the coated confectionery product discharged from the nozzle body, and in a circular translatoric movement in planes perpendicular to the longitudinal direction of the stream of the coated confectionery product discharged from the nozzle body.

10. The method according to claim 9, wherein the stream of the coated confectionary product is co-extruded with a star-shaped cross section coated with the coating substance:

in concave-shaped regions of the star-shape, and no coating substance coating applied in regions of and at the points of the star-shape; or in convex-shaped regions of the star-shape, and no coating substance applied in the concave-shaped regions of the star-shape.

11. The method according to the claim 9, wherein the frozen confection is ice-cream, and the coating substance is chocolate.

12. The method according to claim 11, comprising heating the nozzle body to a temperature above a temperature of the ice-cream.

13. The method according to claim 9, wherein the frozen confection is ice-cream, and the method comprises controlling the stream of the coating substance and the frozen confection through the nozzle body during the co-extruding such that the amount of the coating substance and the frozen confection is decreasing, increasing or constant.

14. The method according to claim 9, wherein the relative movement is provided by movement of the nozzle body while a holder for the receptacle does not move during discharge of the stream of the coated confectionery product.

15. The method according to claim 9, wherein the circular translatoric movement does not include rotation of the nozzle.

* * * * *